United States Patent
Dellock et al.

(10) Patent No.: US 10,093,220 B2
(45) Date of Patent: Oct. 9, 2018

(54) TIE DOWN CLEAT ASSEMBLY HAVING INCREASED FUNCTIONALITY

(71) Applicant: FORD GLOBAL TECHNOLOGIES, LLC, Dearborn, MI (US)

(72) Inventors: Paul Kenneth Dellock, Northville, MI (US); Stuart C. Salter, White Lake, MI (US); Michael A. Musleh, Canton, MI (US); Joseph Myszka, Livonia, MI (US); Aaron Bradley Johnson, Allen Park, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,116

(22) Filed: Jan. 20, 2017

(65) Prior Publication Data
US 2018/0208102 A1    Jul. 26, 2018

(51) Int. Cl.
*B60P 7/08*    (2006.01)

(52) U.S. Cl.
CPC .................................. *B60P 7/0807* (2013.01)

(58) Field of Classification Search
CPC .................................................... B60P 7/0807
USPC ................ 410/106, 107, 109–111, 113, 116; 24/115 K, 265 CD; 248/499; 114/218
See application file for complete search history.

(56) References Cited

U.S. PATENT DOCUMENTS

| | | | | |
|---|---|---|---|---|
| 4,907,921 A | * | 3/1990 | Akright | B61D 45/001 410/111 |
| 6,039,520 A | * | 3/2000 | Cheng | B60P 7/0807 410/106 |
| 6,138,975 A | | 10/2000 | McDaid | |
| 7,578,645 B2 | | 8/2009 | Terry et al. | |
| 7,805,816 B1 | | 10/2010 | Thorne, III et al. | |
| 7,877,904 B2 | | 2/2011 | Bryne | |
| 9,045,070 B2 | | 6/2015 | Pauluk et al. | |
| 2007/0130734 A1 | | 6/2007 | Handel | |
| 2009/0119891 A1 | | 5/2009 | Leung | |

FOREIGN PATENT DOCUMENTS

CN    203336033 U    12/2013

OTHER PUBLICATIONS

English Machine Translation of CN203336033U.

* cited by examiner

*Primary Examiner* — Stephen T Gordon
(74) *Attorney, Agent, or Firm* — Jason Rogers; King & Schickli, PLLC

(57) ABSTRACT

A tie down cleat assembly includes a cleat body having a mounting lug, a first receiver, a second receiver and a third receiver. The multiple receivers provide versatility, enhancing the functionality of the cleat for tie down purposes.

11 Claims, 16 Drawing Sheets

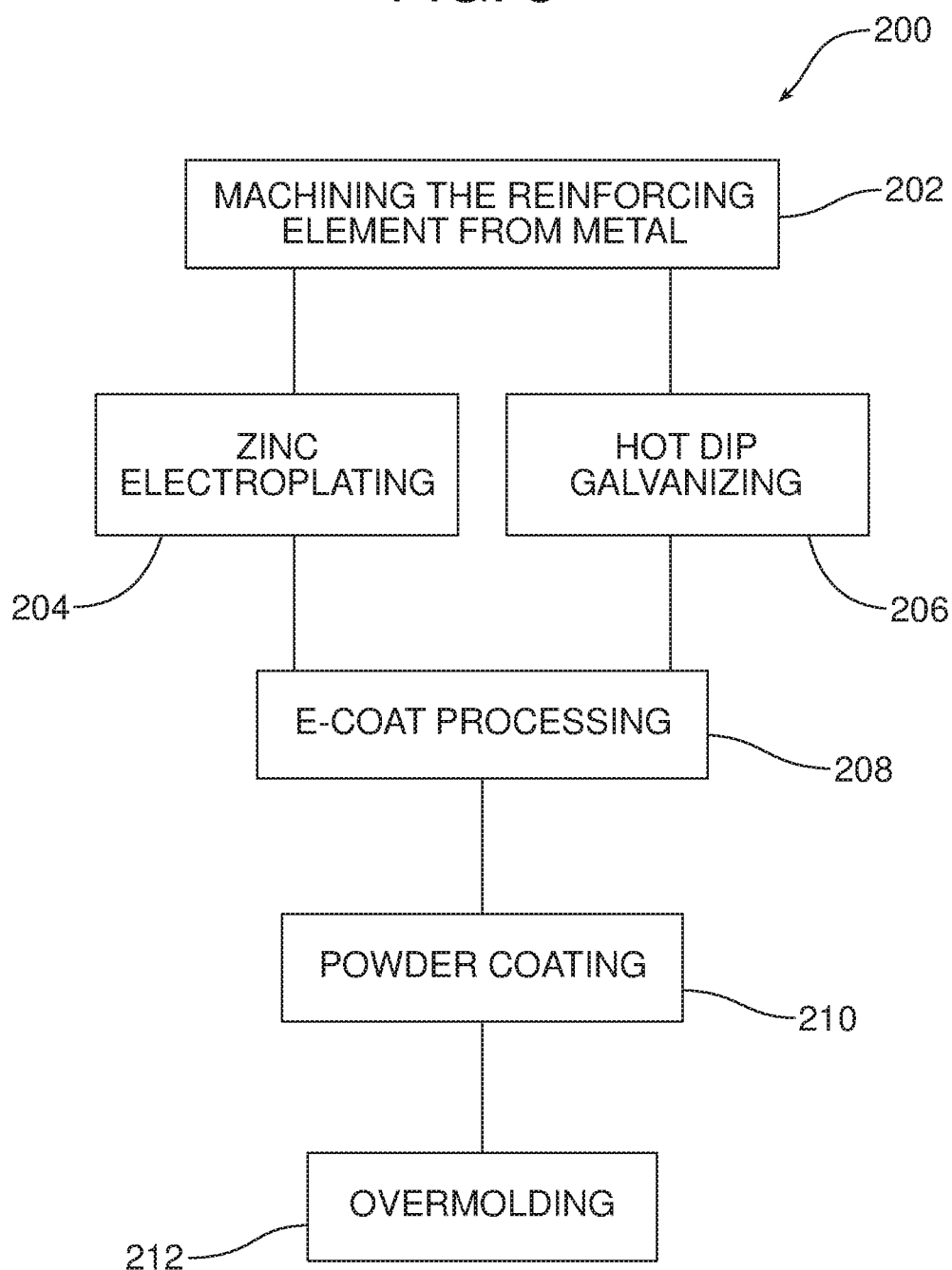

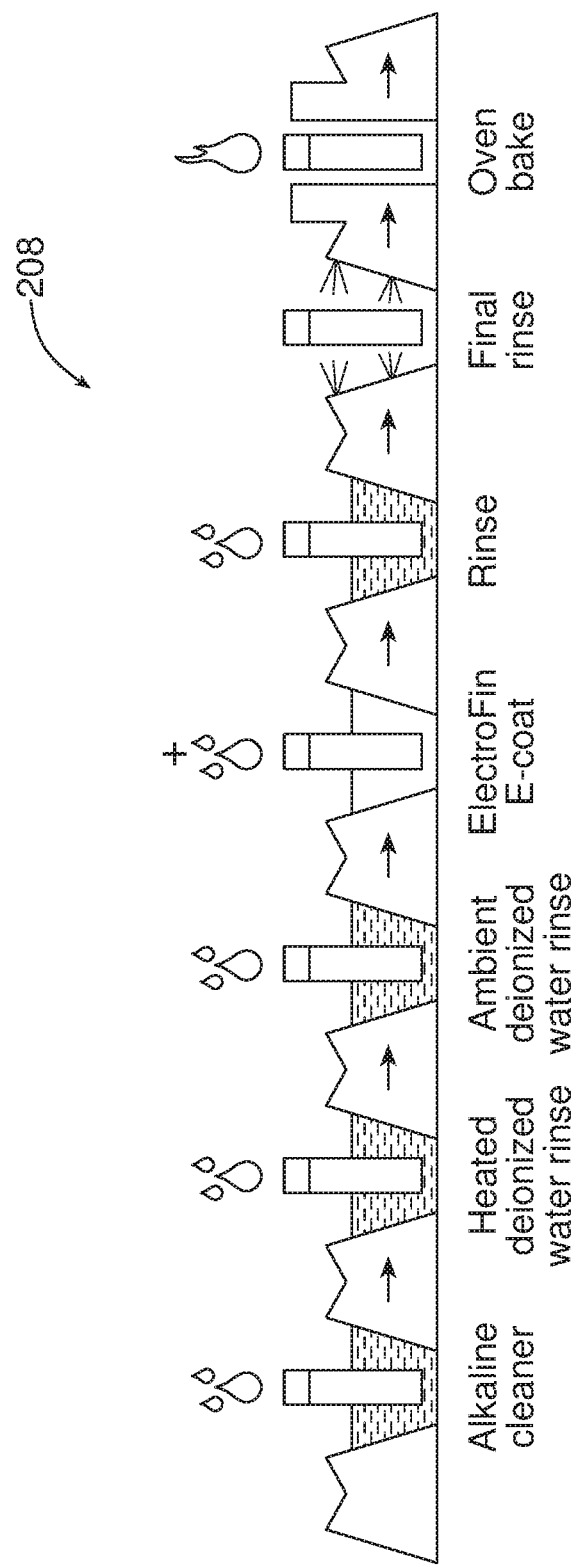

TIE DOWN CLEAT ASSEMBLY HAVING INCREASED FUNCTIONALITY

TECHNICAL FIELD

This document relates generally to the motor vehicle equipment field, and more particularly, to a new and improved tie down cleat assembly.

BACKGROUND

It is well known in the art to provide motor vehicles such as pickup trucks with tie down cleats for securing cargo with ropes, straps, bungee cords or other suitable tethers.

This document relates to a new and improved tie down cleat that provides a number of benefits and advantages over state of the art tie down cleats including, but not necessarily limited to, (a) increased strength, including at higher ambient temperatures, (b) increased finish integrity more resistant to chipping and corrosion as well as (c) enhanced functionality and versatility for receiving and holding a wide range of different types of tethers.

SUMMARY

In accordance with the purposes and benefits described herein, a new and improved tie down cleat assembly is provided. That tie down cleat assembly comprises a cleat body including a mounting lug, a first receiver, a second receiver and a third receiver.

The first receiver may comprise a first inner margin of the cleat body defining a first aperture. The second receiver may comprise a second inner margin of the cleat body defining a second aperture. The third receiver may comprise a third inner margin of the cleat body defining a third aperture.

The cleat body may include a reinforcing element at least partially encapsulated in an overmolded outer shell made from plastic or other appropriate material. The first inner margin may be formed by a portion of the overmolded outer shell. The second inner margin may be formed by a first exposed portion of the reinforcing element. Similarly, the third inner margin may be formed by a second exposed portion of the reinforcing element.

The reinforcing element may be steel and the overmolded outer shell may be plastic. Further, the second inner margin and the third inner margin may flank the first inner margin.

The reinforcing element may include a zinc coating. The reinforcing element may include a cathodic electrocoat over the zinc coating. The reinforcing element may include a powder coat over the cathodic electrocoat. The cathodic electrocoat may be a cathodic epoxy electrocoat or a cathodic acrylic electrocoat.

The tie down cleat assembly may further include a latch assembly comprising a lock body that is pivotally secured to the cleat body by a spine. The latch assembly may also include a lock cylinder and a latch bolt carried on the lock body.

The tie down cleat assembly may further include an anchor plate that is fixed to a body of a motor vehicle. That anchor plate may include a keyhole receiver. The keyhole receiver may include a first section receiving and engaging the mounting lug and a second section receiving and engaging the lock body.

The lock body may include at least one lug engaging with a sidewall of the second section of the keyhole receiver. In addition, the tie down cleat assembly may include a tool to displace the latch bolt between a locked position engaged with the anchor plate in an unlocked position disengaged from the anchor plate.

In the following description, there are shown and described several preferred embodiments of the tie down cleat assembly. As it should be realized, the tie down cleat assembly is capable of other, different embodiments and its several details are capable of modification in various, obvious aspects all without departing from the tie down cleat assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tie down cleat assembly and together with the description serve to explain certain principles thereof.

FIG. 5 is a schematic block diagram of a method of manufacturing the cleat body.

FIG. 7 is a schematic illustration of the e-coat process for the reinforcing element of the cleat body.

Reference will now be made in detail to the present preferred embodiments of the tie down cleat assembly, examples of which are illustrated in the accompanying drawing figures.

DETAILED DESCRIPTION

Figure 1:
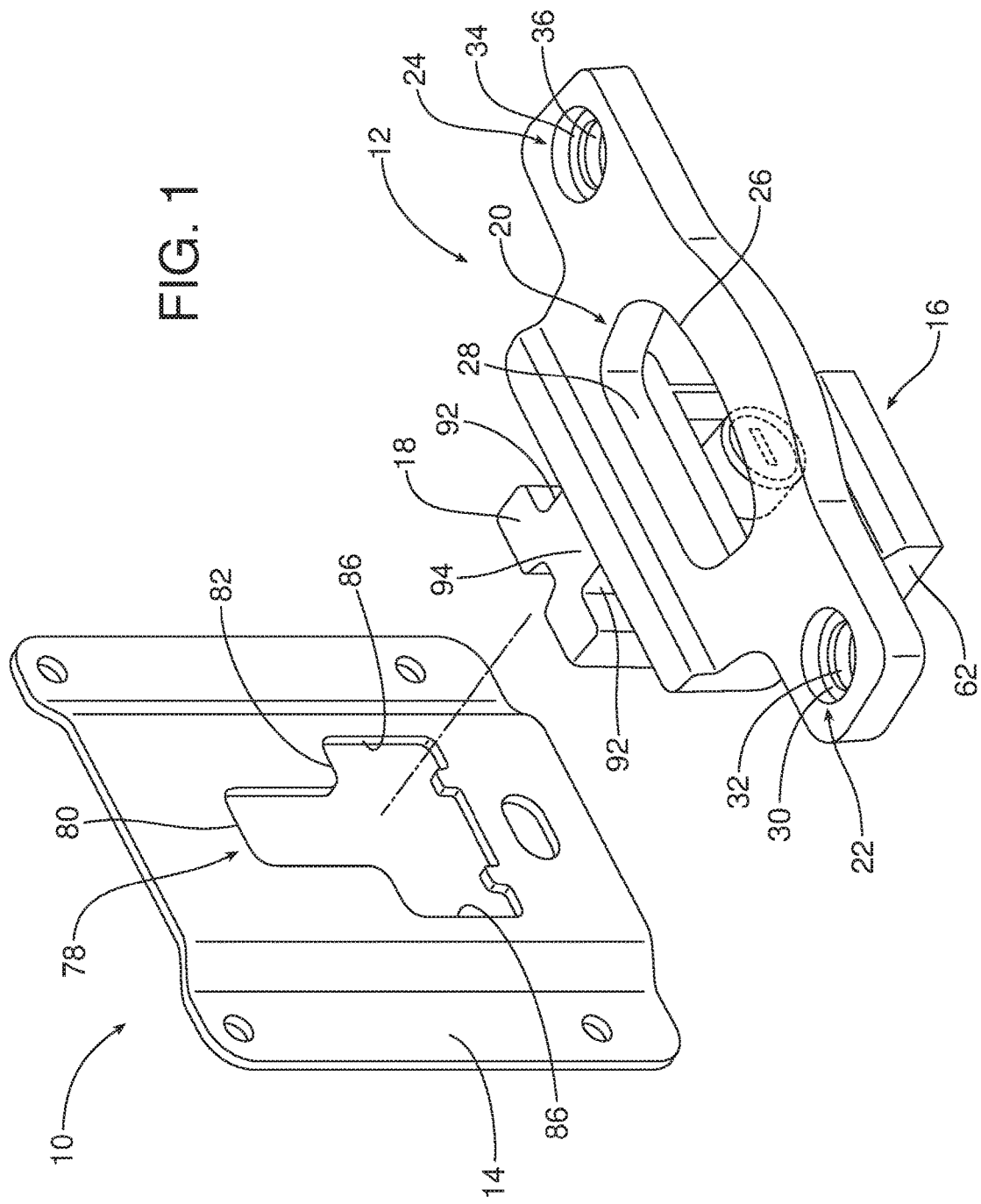
FIG. 1 is a partially exploded perspective view of the entire tie down cleat assembly.

Reference is now made to FIG. 1 illustrating the tie down cleat assembly 10. The tie down cleat assembly 10 includes a cleat body 12, an anchor plate 14 and a latch assembly 16 carried on the cleat body and adapted to secure the cleat body to the anchor plate.

In the illustrated embodiment, the cleat body 12 includes a mounting lug 18, a first receiver 20, a second receiver 22 and a third receiver 24. The first receiver 20 comprises a first inner margin 26 of the cleat body 12 defining a first aperture 28. The second receiver 22 comprises a second inner margin 30 of the cleat body 12 defining a second aperture 32. The third receiver 24 comprises a third inner margin 34 of the cleat body 12 defining a third aperture 36. In the illustrated embodiment, (a) the second inner margin 30 and second aperture 32 and (b) the third inner margin 34 and third aperture 36 flank the first inner margin 26 and first aperture 28.

Figure 2:
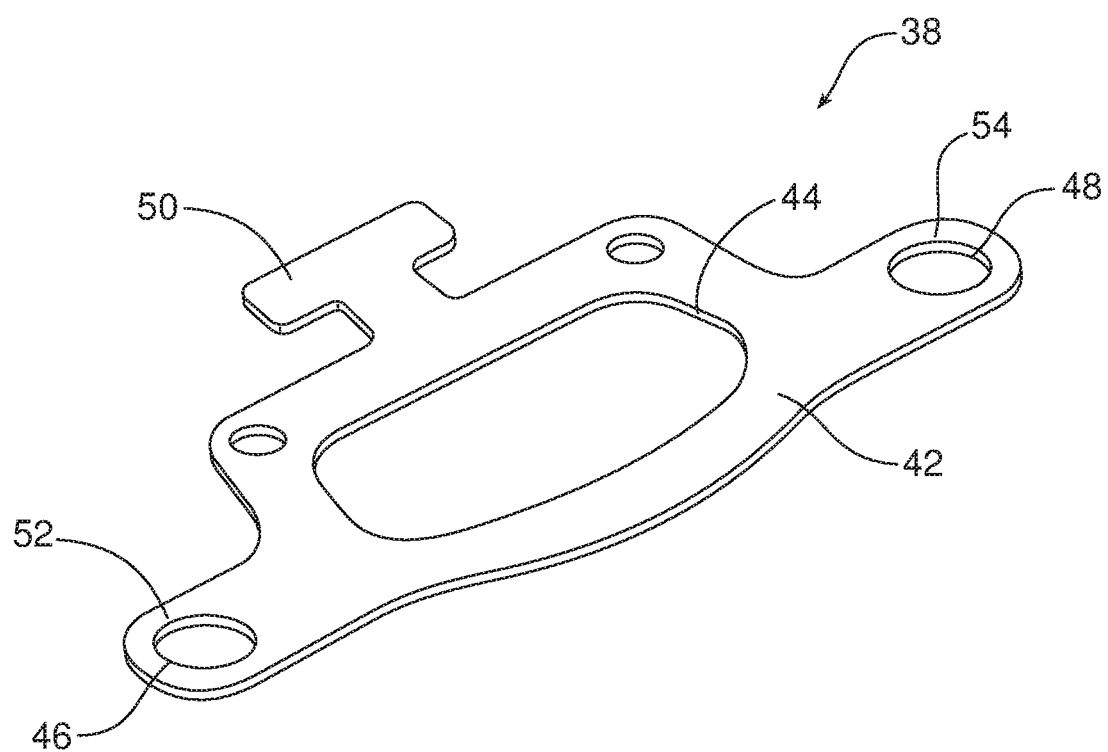
FIG. 2 is a detailed perspective view of the reinforcing element or core of the cleat body.
Figure 3:
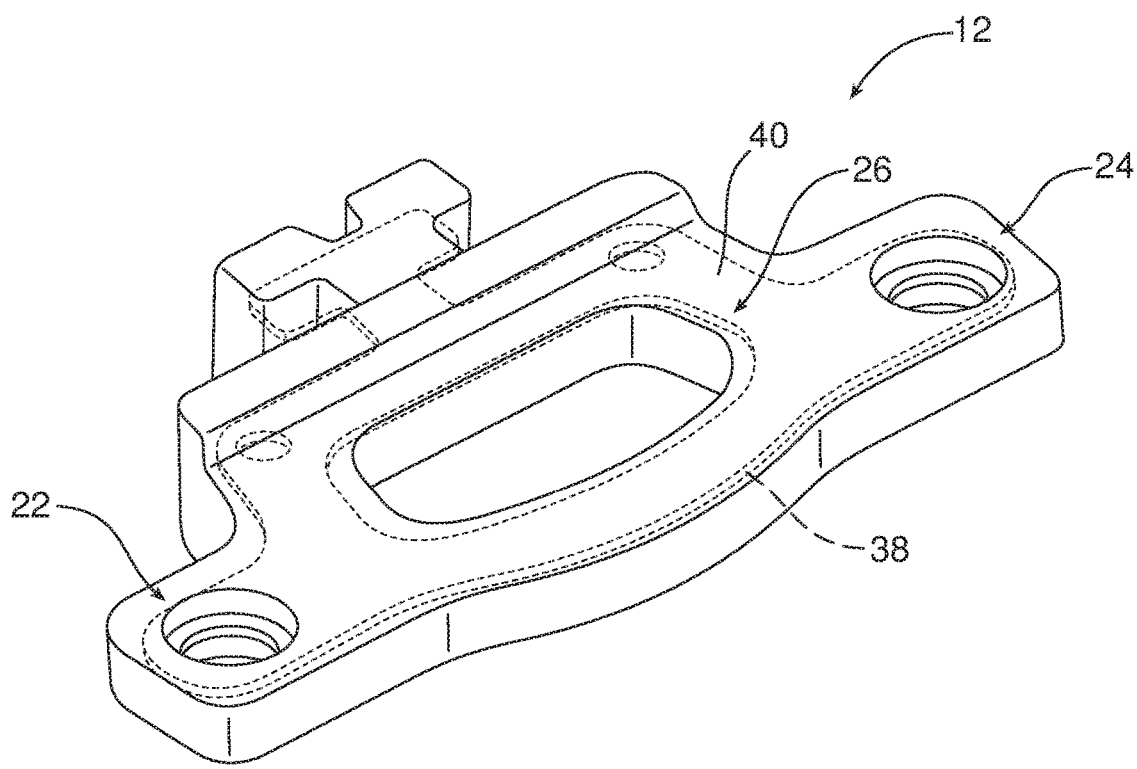
FIG. 3 is a perspective view of the cleat body including the overmolded reinforcing element.

As best illustrated in FIGS. 2 and 3, the cleat body 12 is metal reinforced for strength and includes a reinforcing element 38 overmolded with an outer shell of 40 a plastic or other appropriate material. As best illustrated in FIG. 2, the reinforcing element 38 includes a main body 42 having a first relatively large central opening 44 corresponding to the first aperture 28 flanked by two smaller openings 46 and 48 corresponding, respectively, to the second aperture 32 and the third aperture 36. In addition, the reinforcing element 38 includes a projecting lug 50 that corresponds with and reinforces the mounting lug 18 of the cleat body 12.

During manufacture, the smaller openings 46, 48 in the main body 42 of the reinforcing element 38 function as locating holes to precisely locate the steel reinforcement or reinforcing element in the molding tool and the margins 52, 54 around the respective openings 46, 48 function as clamping points.

Figure 9:
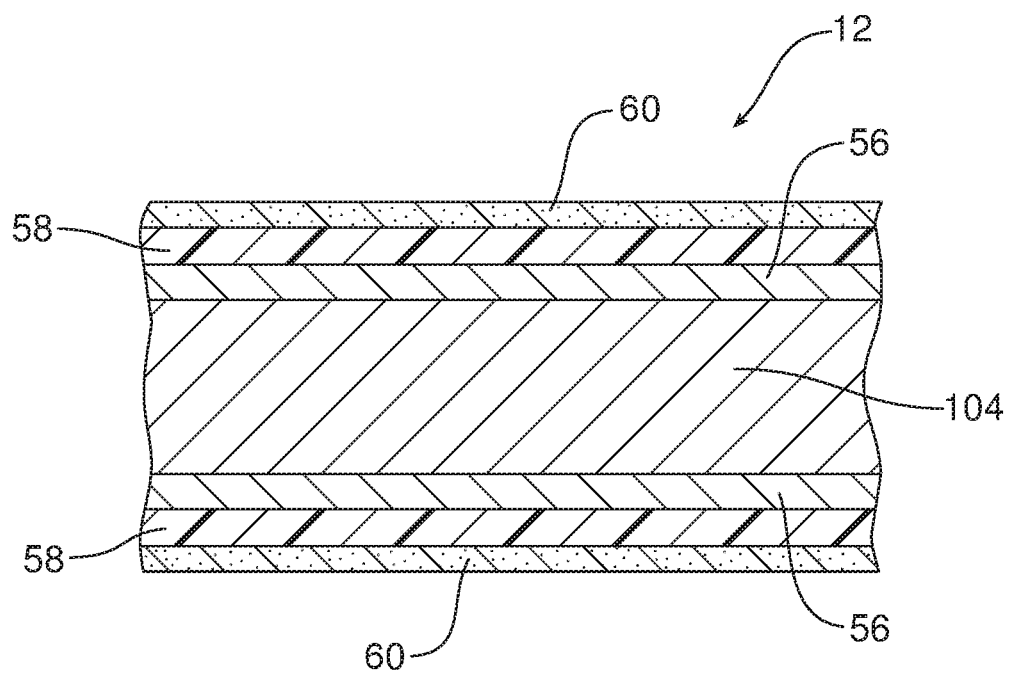
FIG. 9 is a detailed cross-sectional view through the reinforcing element showing the metal substrate and the various protecting layers.

In the finished cleat body 12, the first inner margin 26 is formed by a portion of the overmolded outer shell 40 extending through the central opening 44 in the reinforcing element 38. In contrast, the second inner margin 30 around the second aperture 32 is formed by the first exposed portion or margin 52 of the reinforcing element 38 around the hole 46. Similarly, the third inner margin 34 is formed by the second exposed portion or margin 54 of the reinforcing element 38 around the hole 48. As will become apparent from the following description and illustrated in FIG. 9, the reinforcing element 38 may include a zinc coating 56 and a cathodic electrocoat 58 over the zinc coating. Still further, a powder coat 60 may be provided over the cathodic electrocoat 58. The cathodic electrocoat 58 may be a cathodic epoxy electrocoat or a cathodic acrylic electrocoat. The powder coat 60 is a free-flowing, dry powder. The powder coating 60 does not require a solvent to keep the binder and filler in liquid suspension form. The powder coat 60 is applied electrostatically and is then cured under heat to allow it to flow and form a "skin". The powder coat 60 may incorporate a thermoplastic material or a thermoset material.

The latch assembly 16 of the tie down cleat assembly 10 may include a lock body 62 that is pivotally secured to the cleat body 12 by a spine 64. See, for example, FIGS. 1 and 4c-4f. More specifically, in the illustrated embodiment, the latch body 12 includes an integral yoke 66 and the pivot pin or spine 64 passes through the two legs of the yoke 66 and a mounting aperture (hidden from view) provided in the cleat body.

As further illustrated in drawing FIGS. 1 and 4c-4f, the latch assembly 16 also includes a lock cylinder 70 held in a mounting boss 72 integrally formed in the lock body 62. A tool 74 is inserted into the lock cylinder 70 and utilized to displace the latch bolt 76 of the lock cylinder 70 between a locked position engaged with the anchor plate 14 and an unlocked position disengaged from the anchor plate. In the illustrated embodiment the tool 74 is a key.

In the illustrated embodiment, the anchor plate 14 includes a keyhole receiver 78 having a relatively narrow first section 80 for receiving and engaging the mounting lug 18 of the cleat body 12 and a relatively wide second section 82 for receiving and engaging the lock body 62 when the lock body is pivoted into a locking or locked position. More specifically, the lock body 62 includes at least one lug 84 for engaging with a sidewall 86 of the second section 82 of the keyhole receiver 78 when the cleat body 12 is fully seated on the anchor plate 14 and the latch assembly 16 is engaged to lock the cleat body in that position.

Reference is now made to FIGS. 4a-4g, which fully illustrate, step-by-step, the procedure for locking the cleat body 12 to the anchor plate 14.

Figure 4A:
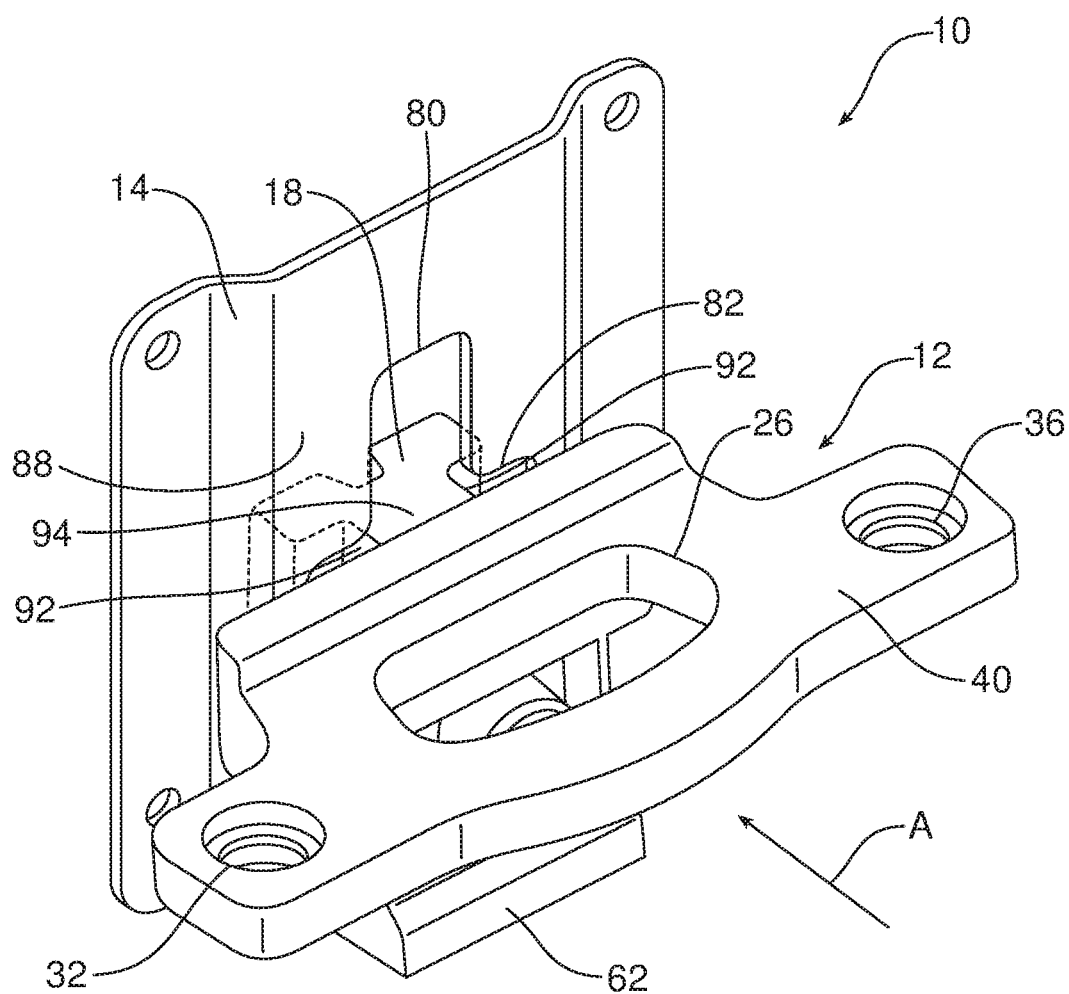
FIGS. 4a-4g are a series of views illustrating how the cleat body is secured to the anchor plate by means of the latch assembly pivotally secured to the cleat body.
Figure 4B:
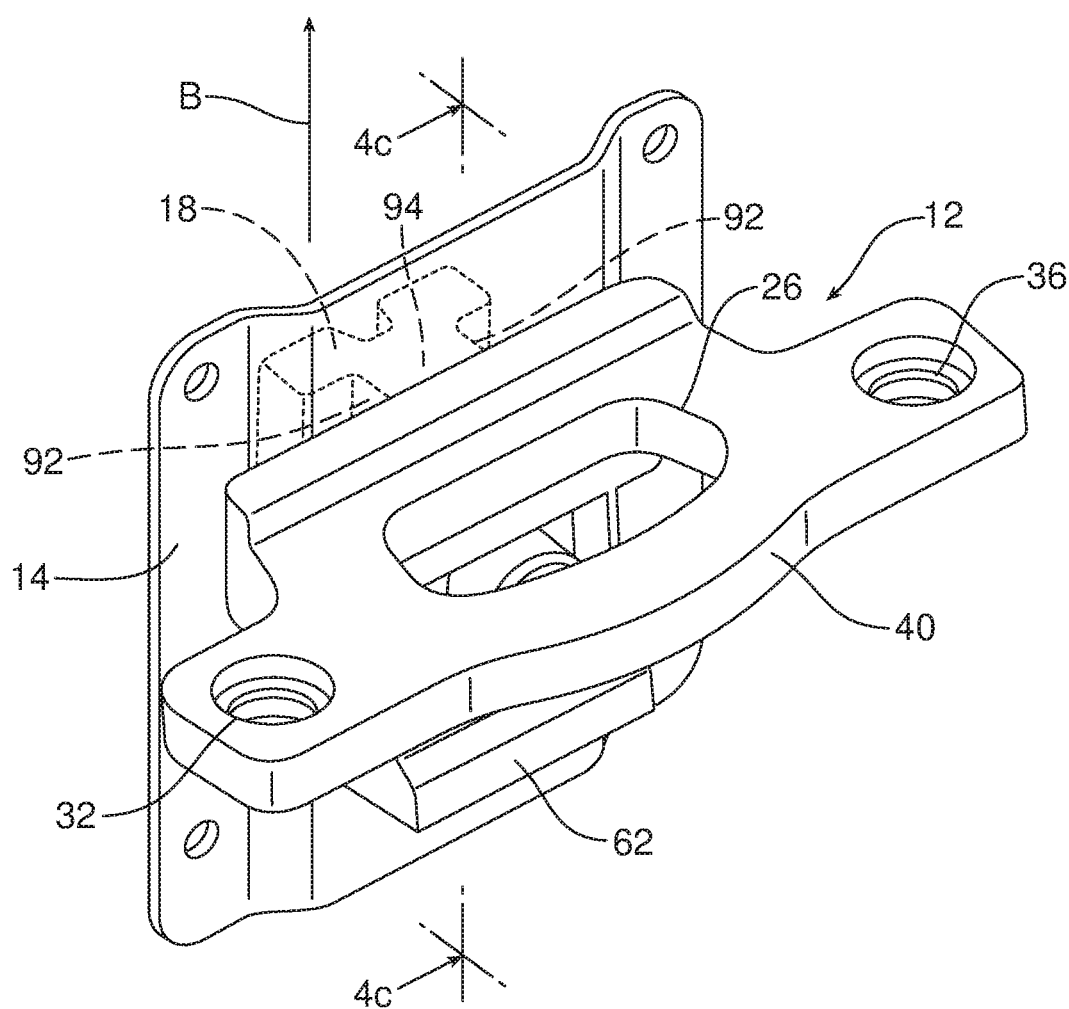

As illustrated in FIG. 4a, first one aligns the mounting lug 18 on the cleat body 12 with the second section 82 of the keyhole receiver 78 in the anchor plate 14. The cleat body 12 is then moved in the direction of action arrow A in order to insert the mounting lug 18 in the second section 82 of the keyhole receiver 78 until the face 88 of the anchor plate 14 is engaged with the face 89 of the cleat body 12 (note also FIG. 4c). The cleat body 12 is then shifted in the direction of action arrow B with respect to the anchor plate 14 so that the margin 90 of the anchor plate outlining the first section 80 of the keyhole receiver 78 is received in the slots 92 in the opposed sides of the mounting lug 18 and the stem 94 of the mounting lug between the slots is fully seated within the first section 80 of the keyhole receiver 78. Note FIGS. 4b and 4c.

Figure 4C:
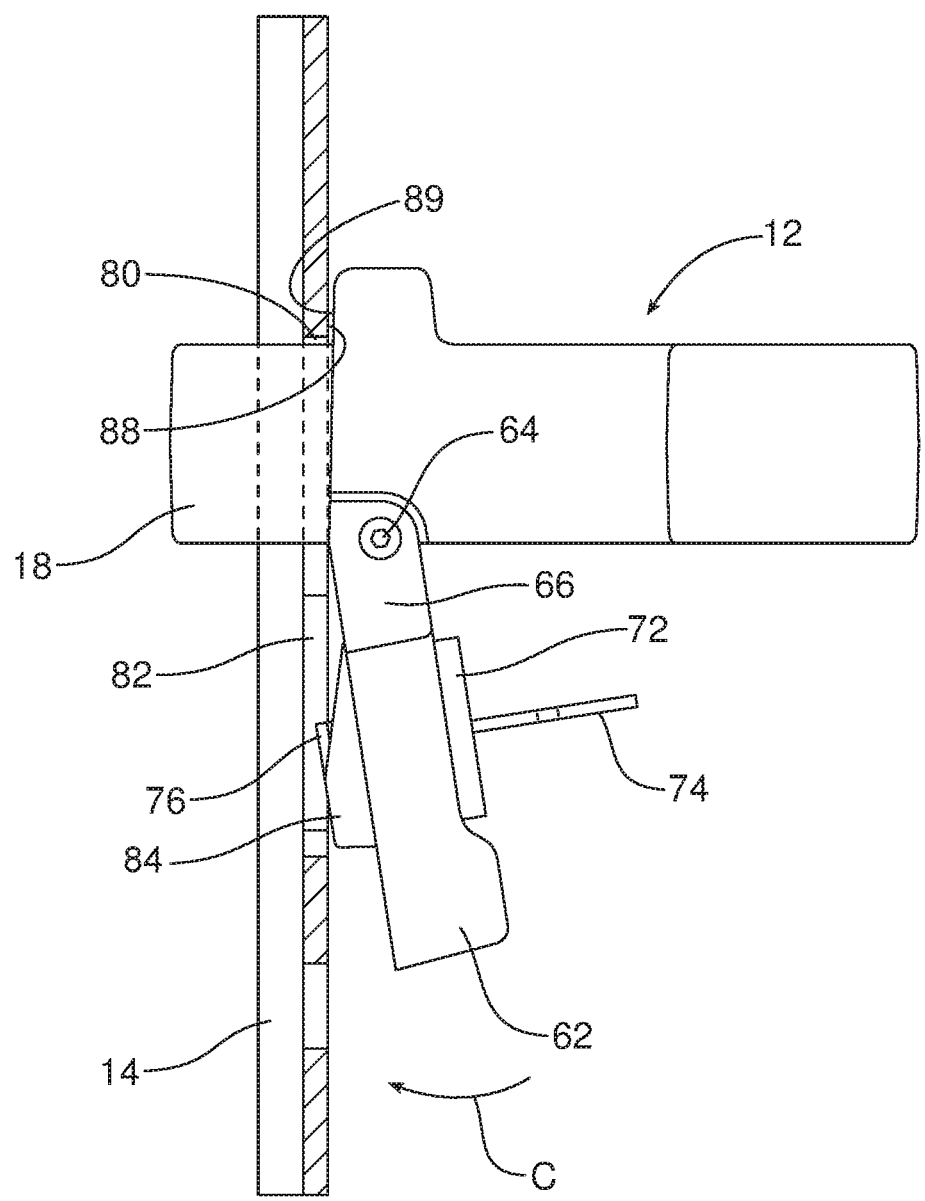
Figure 4D:
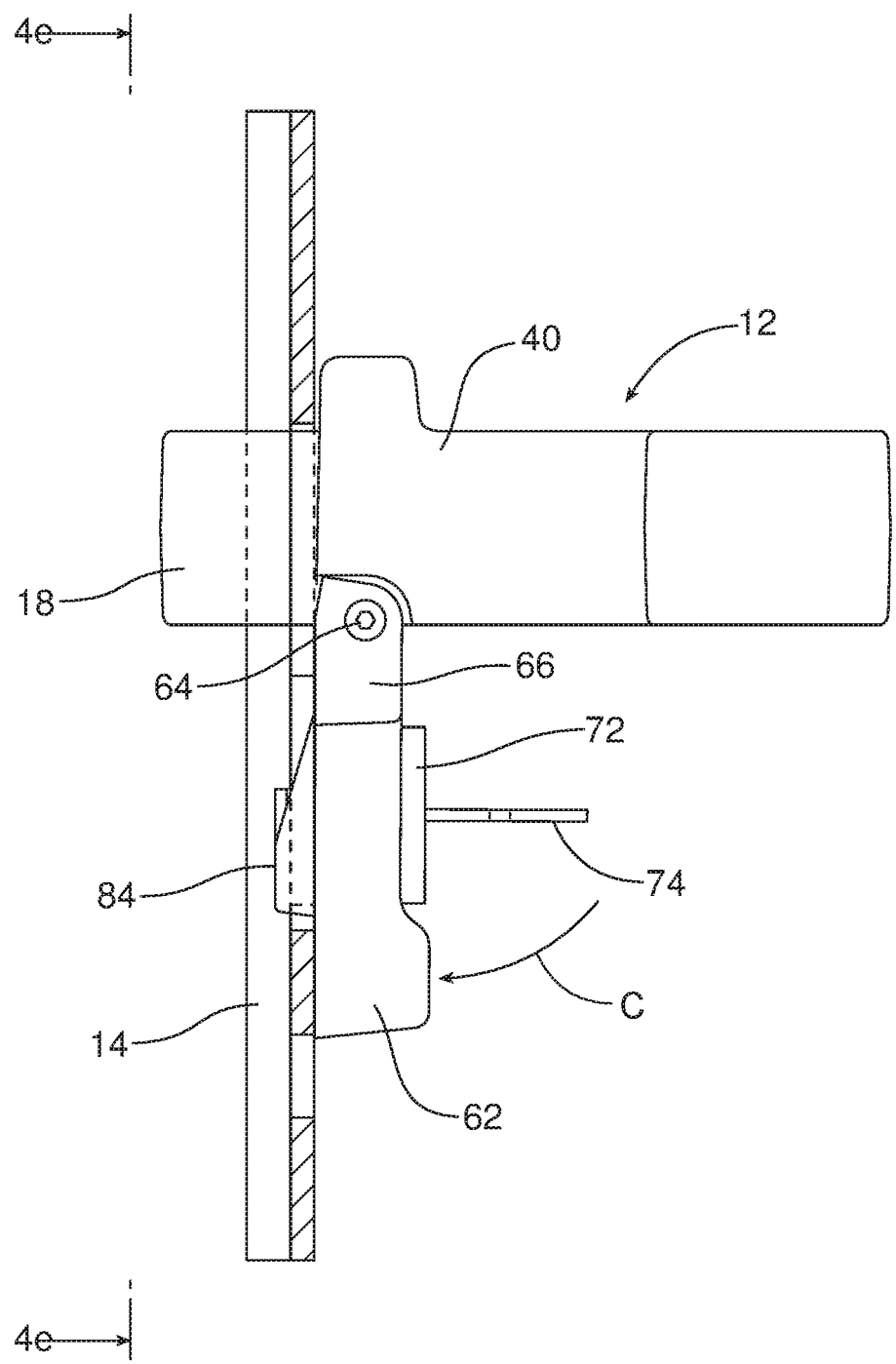

Next, the lock body 62 of the latch assembly 16 is pivoted in the direction of action arrow C from the installation position illustrated in FIG. 4c to the fully engaged position illustrated in FIG. 4d wherein the projecting lugs 84 on the lock body 62 are inserted into the second section 82 of the keyhole receiver 78. The lock body 62 is fully seated in the engagement position when the lower ends 96 of the lugs 84 engage in the channels 98 formed by the tabs 100 on the anchor plate 14. Those tabs 100 at the bottom edge of the second section 82 of the keyhole receiver 78 ensure proper alignment. See FIG. 4e.

Figure 4E:
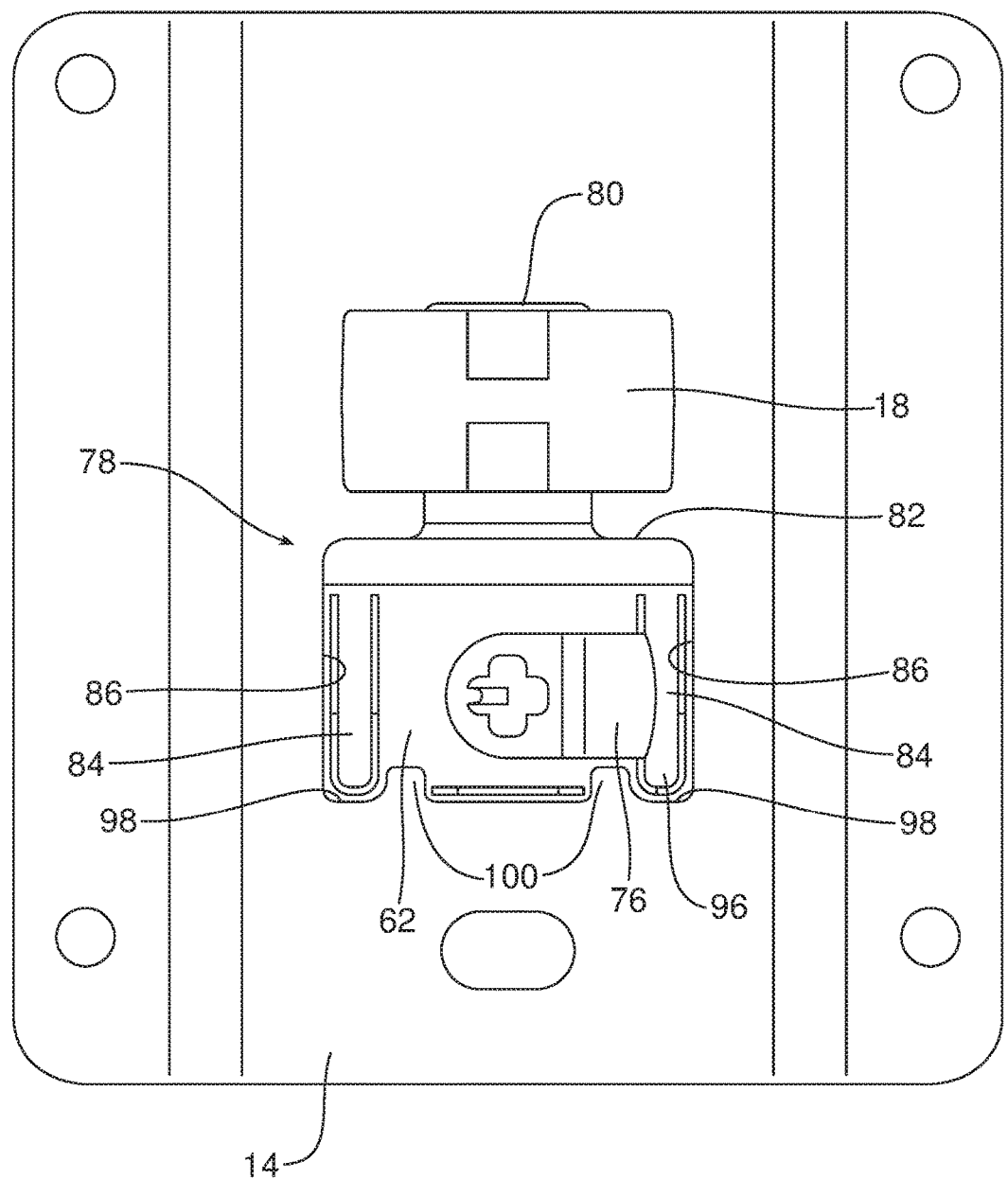
Figure 4F:
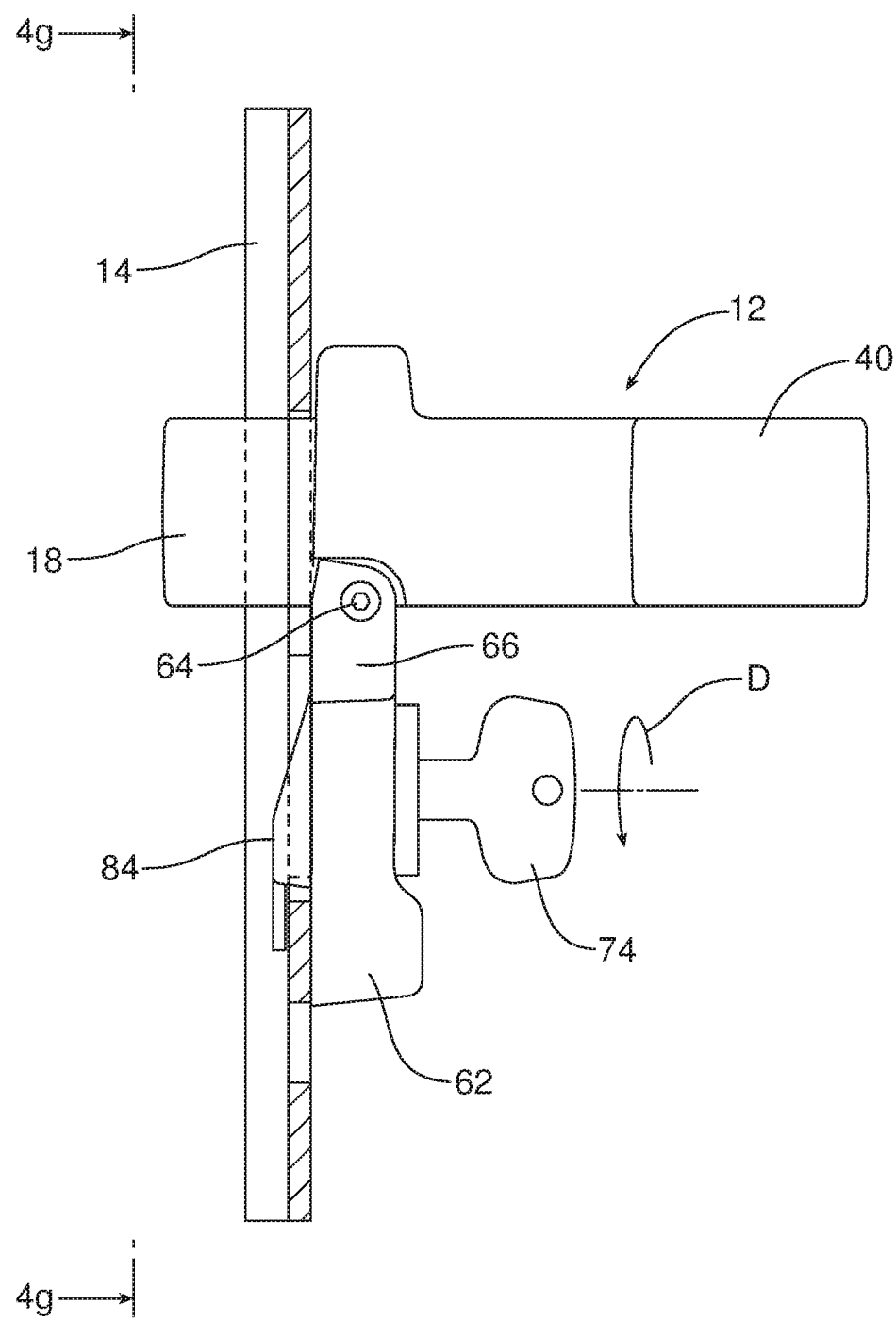
Figure 4G:
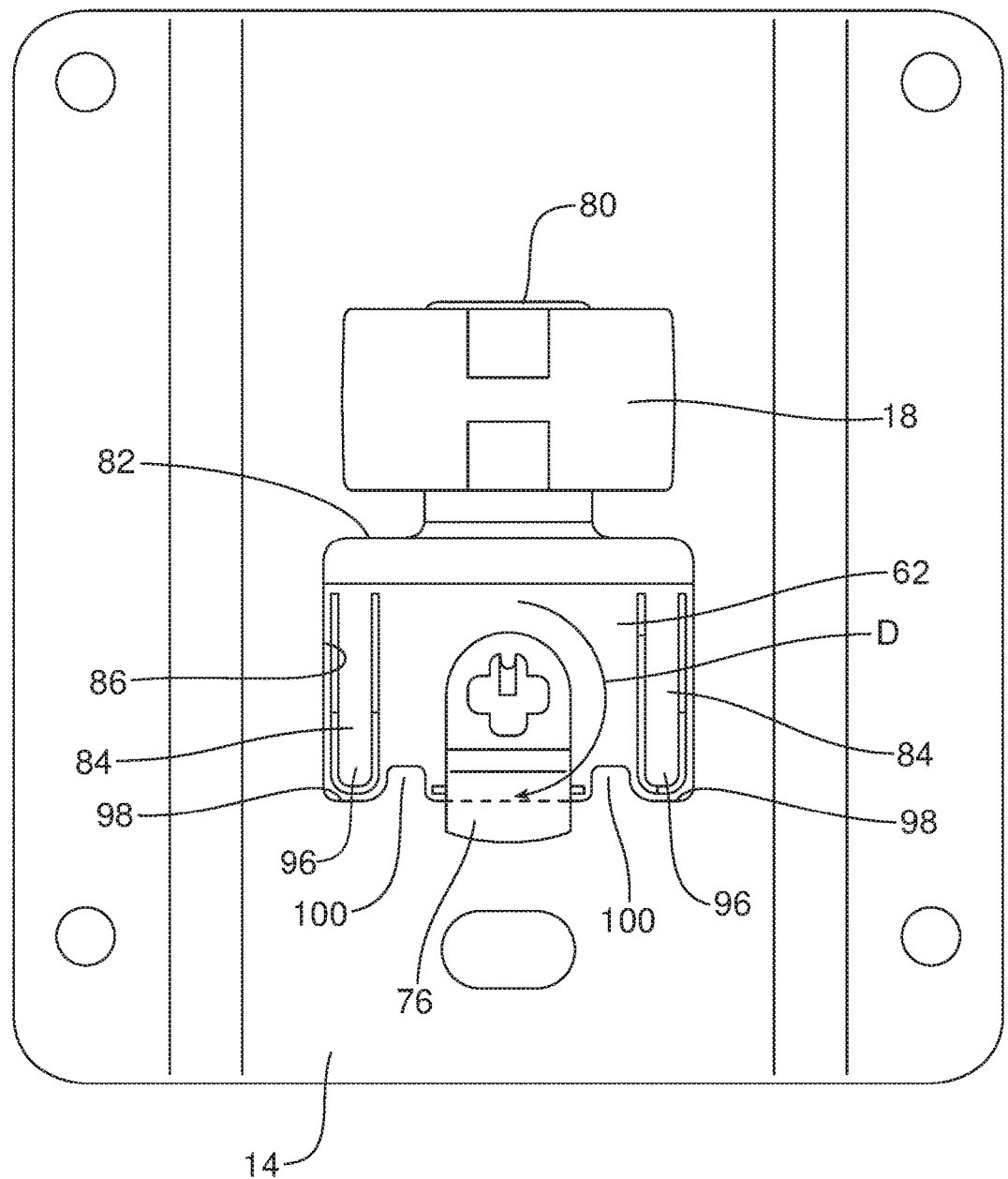

Next, the tool 74 is inserted in to the lock cylinder 70 and the lock cylinder is rotated in the direction of action arrow D. As illustrated in FIGS. 4e-4g this causes the latch bolt 76 to be rotated from the unlocked position disengaged from the anchor plate 14 to the locked position wherein the latch bolt is engaged with the anchor plate and the cleat body 12 is secured thereto. The tool 74 is then removed from the lock cylinder 70 in order to provide a secure connection and prevent theft of the cleat body 12.

As should be appreciated, the cleat body 12 may be removed from the anchor plate 14 by completing the previously described steps in the opposite order. Thus, one inserts the tool 74 in the lock cylinder 70 and rotates the lock cylinder to rotate the latch bolt 76 from the locked position, engaged with the anchor plate 14, to the unlocked position disengaged from the anchor plate 14. One then pivots the lock body 62 from the engagement position to the insertion position. Next, one slides the cleat body 12 in a direction opposite to action arrow B so that the mounting lug 18 is displaced from the first section 80 of the keyhole receiver 78 to the second section 82 of the keyhole receiver 78. The cleat body 12 is then pulled away from the anchor plate 14 thereby removing the mounting lug 18 from the keyhole receiver 78 by passage through the second section 82 thereof. The cleat body 12 is then free of the anchor plate 14.

Reference is now made to FIG. 5 which is a schematic block diagram of the process or method 200 of manufacturing the cleat body 12. The first step involves machining the reinforcing element 38 from a metal substrate 202. This may be done by cutting, stamping or any other appropriate means.

Next, the cut reinforcing element 38 is either subjected to zinc electroplating 204 or hot-dip galvanizing 206 in order to provide a zinc coating 56 over the metal substrate 104. See also FIG. 9.

Figure 6A:
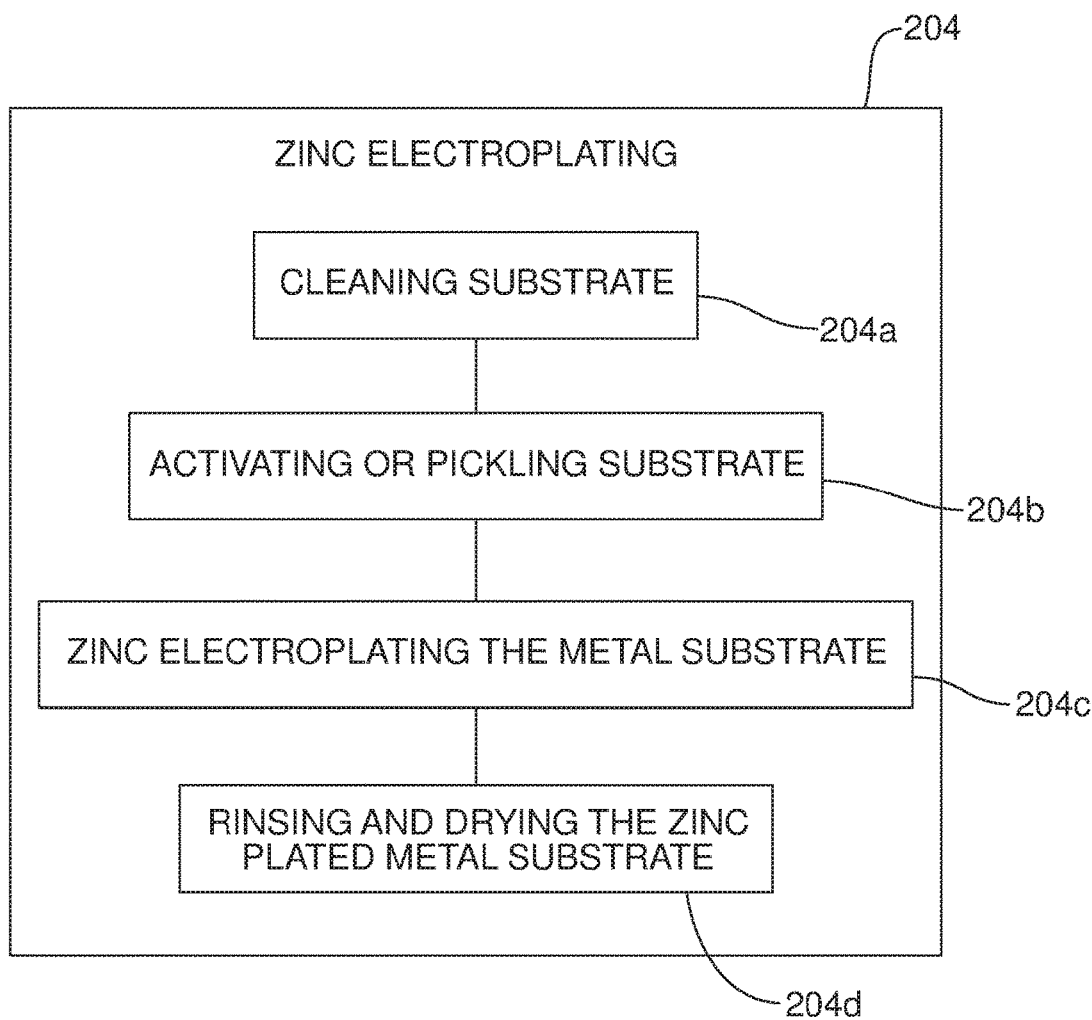
FIG. 6a is a schematic block diagram of a zinc electroplating process for the reinforcing element of the cleat body.

As illustrated in FIG. 6a, the zinc electroplating process 204 includes the steps of cleaning the substrate 204a, activating or pickling the substrate 204b, zinc electroplating the substrate 204c and then rinsing and drying the reinforcing element 204d.

More specifically, the substrate is cleaned at step 204a in order to remove any dirt, rust, oil or other contaminants from the surface of the metal substrate 104 being treated. As is known in the art, an alkaline detergent may be used for this purpose. The process of cleaning involves two steps: alkaline bath and electro cleaning. First, the metal substrate 104 is soaked in the alkaline bath for five to ten minutes in order to remove soil, dirt and contaminants. The metal substrate 104 is then cleaned further in an electro cleaner. More specifically, an electric charge is applied to the metal substrate 104 either at its cathode or anode end. This results in the release of oxygen or hydrogen from the solution and cleaning of the metal substrate 104 at a micro level. The time and temperature factors are similar to those for the alkaline soak process.

Following cleaning of the substrate at step 204a is activating and pickling the substrate at step 204b. Activation or pickling of the metal substrate 104 involves removal of oxides and scales from the surface by using various acid solutions such as sulfuric acid or hydrochloric acid. The type of metal and the thickness of the scale present on the metal decides the type of acid, the dipping time and the temperature required for activating or pickling in accordance with parameters known in the art.

After completing the activating or pickling of the substrate at step 204b, the metal substrate 104 is subjected to zinc electroplating. First the metal substrate 104 is washed in water. This is followed by placing the metal substrate 104 into an aqueous solution such as alkaline cyanide. A direct current is then applied at the anode for a fixed amount of time. This results in the deposition of zinc ions at the cathode: that is, the surface of the metal substrate 104. In order to provide a uniform zinc coating 56 on the metal substrate 104, it is necessary for the anode and cathode to be positioned suitably in the aqueous solution so that the current flow is uniform over the entire area of the metal substrate 104. As is known in the art, the properties of the plating process may be altered by suitable variations in the chemical agents used in the plating bath, the duration of soaking, the electric charge applied and the time and temperature factors.

Following zinc electroplating of the substrate at step 204c, is the step of rinsing and drying the plated metal substrate 104 (see step 204d). More specifically, the plated metal substrate 104 is washed in a water container to remove any contamination of the surface, followed by drying. Rinsing may be done multiple times if desired. More specifically, the plated metal substrate 104 may be cleaned in a rinsing tank or under running water depending upon the level of expected contamination and the extent to which the surface needs to be treated in order to remove the contamination.

Figure 6B:
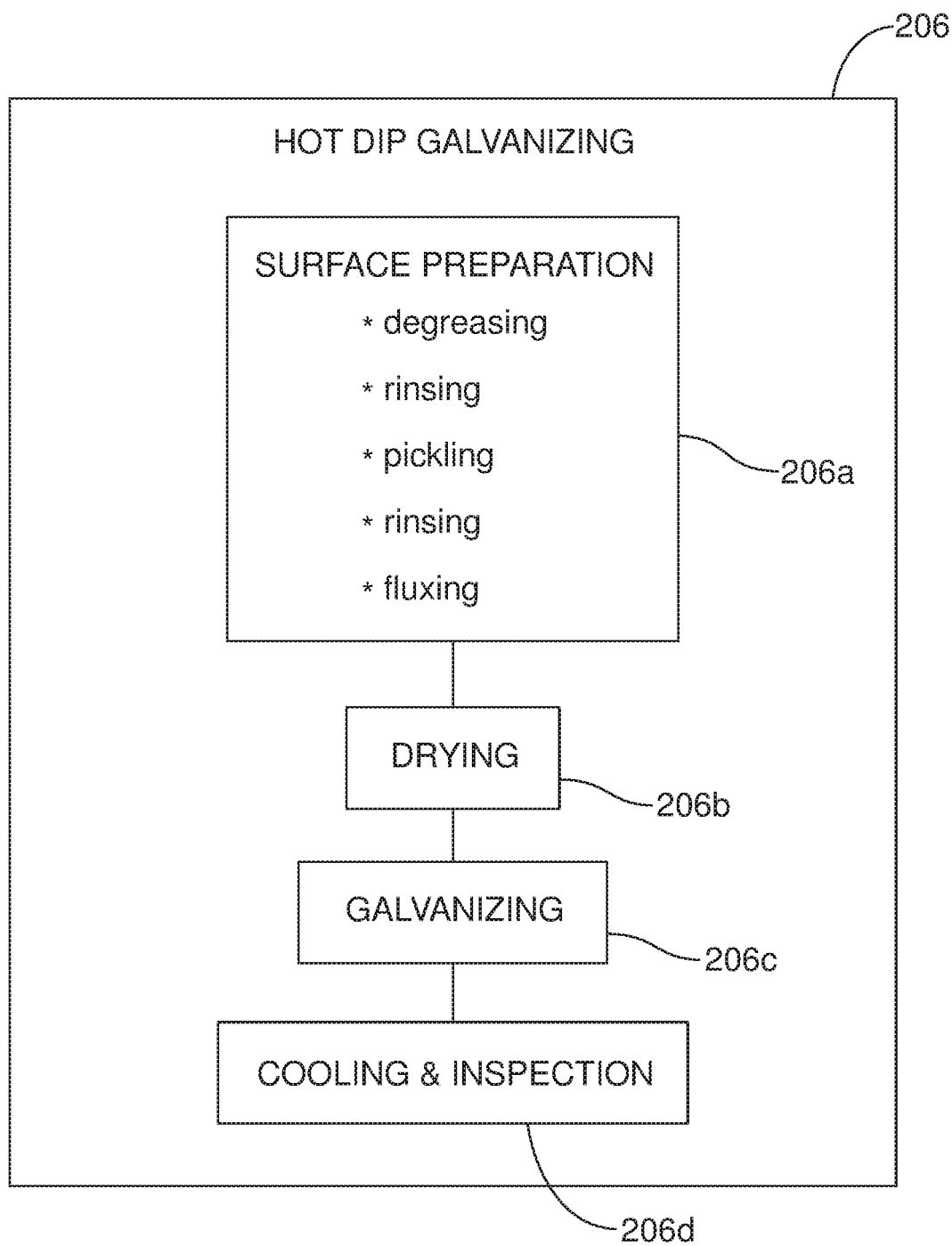
FIG. 6b is a schematic block diagram of a hot dip galvanizing process for the reinforcing element of the cleat body.

The alternative hot-dip galvanizing process 206, illustrated in detail in FIG. 6b, includes surface preparation at 206a, drying at 206b, followed by galvanizing in a zinc bath at 206c and then cooling and inspection at 206d.

More specifically, surface preparation involves degreasing, rinsing, pickling, rinsing and then soaking in a flux solution. More specifically, a hot alkali solution, mild acidic bath or biological cleaning bath removes organic contaminants such as dirt, paint markings, grease and oil from the surface of the metal substrate 104. Epoxies, vinyls, asphalt or welding slag, which cannot be removed by degreasing, is removed before galvanizing by grit blasting, sand blasting or other mechanical means. After degreasing, the metal substrate 104 is rinsed in a water bath. The metal substrate 104 is then subjected to pickling by immersing in a dilute solution of heated sulfuric acid or ambient hydrochloric acid in order to remove mill scale and iron oxides (rust) from steel surfaces. As an alternative to or in conjunction with pickling, the metal substrate 104 may be subjected to abrasive cleaning or air blasting sand, metallic shot or grit onto the steel. Following rinsing in a water bath, the metal substrate 104 is then subjected to fluxing. More specifically, the metal substrate 104 is immersed in a fluxing solution, such as zinc ammonium chloride solution, to remove any remaining oxides and deposit a protective layer on the surface of the metal substrate 104 to prevent any further oxides from forming on the surface prior to immersion in the molten zinc bath.

Following the completion of the surface preparation at method box 206a, the metal substrate 104 is subjected to drying at step 206b.

Next, the metal substrate 104 is subjected to galvanizing at step 206c. This involves immersing the prepared metal substrate 104 in a bath of molten zinc. The bath chemistry may correspond to that specified by ASTM B6, requiring at least 98% pure zinc maintained at 815-850 degrees Fahrenheit (435-455 degrees C.). While immersed in the bath, the zinc reacts with the iron in the steel of the metal substrate 104 to form a series of metallurgically bonded zinc-iron intermetallic alloy layers, commonly topped by a layer of impact resistant pure zinc 56. Once a zinc layer 56 of sufficient thickness is provided, the metal substrate 104 is withdrawn slowly from the galvanizing bath and the excess zinc is removed by draining, vibrating and/or centrifuging.

The metallurgical reaction will continue after the metal substrate 104 is removed from the zinc bath, as long as the metal substrate remains near bath temperature. The galvanized metal substrate 104 is then cooled by either immersion in a passivation solution or water by being left in the open air. The inspection of the hot-dip galvanized steel substrate 104 involves scrutinizing coating thickness and appearance/surface condition. A variety of simple physical tests, known in the art may be performed to determine thickness, uniformity, adherence and appearance. See step 206d.

Following completion of the zinc electroplating process 204 or the hot-dip galvanizing process 206, the metal substrate 104 includes a zinc layer 56 covering the substrate 104. The zinc coating layer 56 may have a thickness on the order of 0.70 ounces per square foot. The zinc coated metal substrate 104 is then subjected to e-coat processing at step 208 (FIG. 5).

The e-coat processing 208 is illustrated in detail in FIG. 7. First, alkali cleaning is used, as necessary, to clean the metal substrate 104 with the zinc coating 56 in order to remove oils, grease, wax, polishing compound, particulates and light oxides from the part surface. Next, the metal substrate 104 with the zinc coating 56 is rinsed thoroughly through a series of tanks of heated deionized water followed by rinsing in a tank of ambient deionized water.

The metal substrate 104 with the zinc coating 56 is then placed in an e-coat bath consisting of 80% to 90% deionized water and 10% to 20% paint solids. The deionized water acts as a carrier for the paint solids which are under constant agitation. The paint solids consist of resin and pigment. The resin is the backbone of the final paint film and provides corrosion protection, durability and toughness. The pigments are used to provide color and gloss. Following immersion in the e-coat bath to provide a cathodic electrocoat 106 over the zinc coating 56 on the metal substrate 104, the part is rinsed by water spray and then baked at about 375 degrees Fahrenheit for 20 minutes in an oven in order to cure the cathodic electrocoat.

Figure 8:
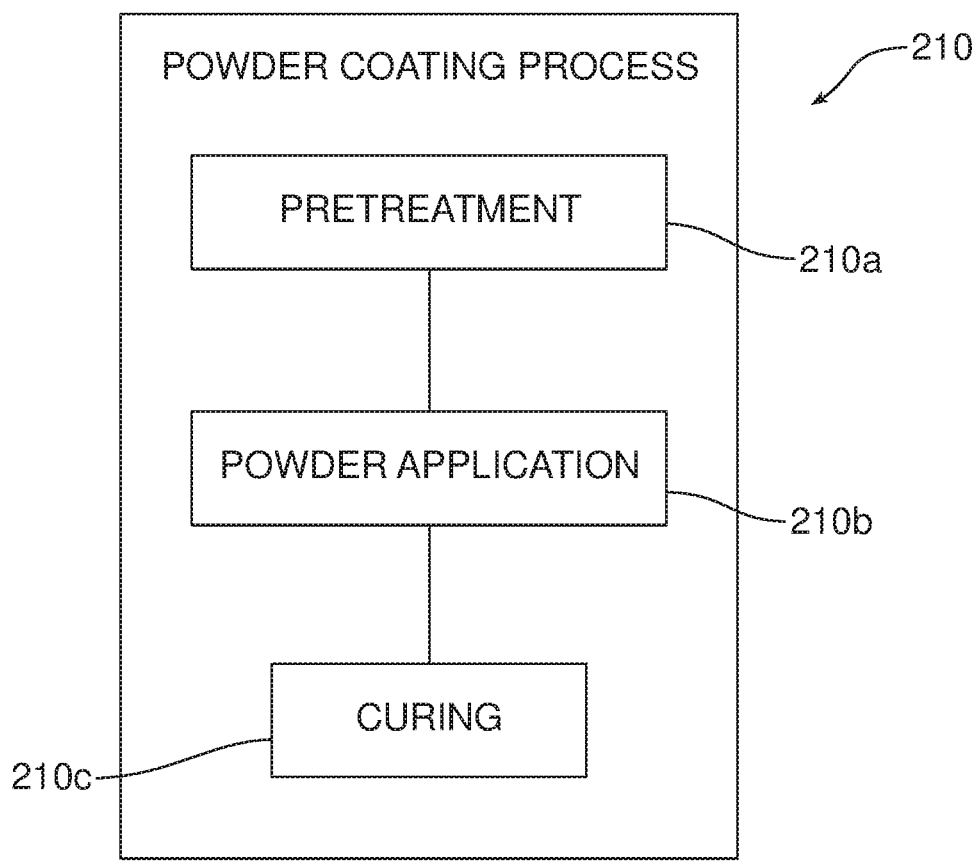
FIG. 8 is a schematic illustration of the powder coating process for the reinforcing element of the cleat body.

Next, the metal substrate 104 with the zinc coating 56 and cathodic electrocoat 58 is subjected to powder coating at step 210 (FIG. 5). As illustrated in FIG. 8, the powder coating process 210 includes a pre-treatment step 210a followed by a powder application step 210b and then a curing step 210c. Pre-treatment involves cleaning the part, as necessary, using a combination of phosphate and chromate baths or a spray booth followed by drying of the part.

The powder application may include electrostatic spraying via a spray gun. More specifically, the metal substrate 104 with the zinc coating 56 and the cathodic electrocoat 106 is grounded and the spray gun imparts a positive electric charge onto the powder which is then sprayed and accelerated toward the ground part by the powerful electrostatic charge. The coated metal substrate 104 is then heated and the powder coating melts into a uniform film and hard coating in the form of a powder coat 60 overlying the cathodic electrocoat 58 which overlies the zinc coating 56 on the metal substrate 104. The curing step 210c is completed in an oven at 200 degrees C. for 15 minutes in order to complete the setting of the powder coat.

Following powder coating, the now completed coated metal reinforcement 38 is subjected to overmolding at step 212 (see FIG. 5). More specifically, the coated metal reinforcement 38 is placed in an injection molding tool and molten plastic is injected into the mold surrounding the coated metal substrate 104. The molten plastic utilized for overmolding and creating the outer shell 40 may be a UV stable nylon 6 or other appropriate plastic material in any desired color. The UV stable nylon 6 material may also include 15% to 30% glass reinforcement. Advantageously, glass-filled nylon may be molded in substantially any desired color and provides a hard/stiff (3.6 Gpa flex modulus), scratch and scuff resistant surface. It is also affordable and bonds well to powder-coated plate. Glass filling is preferred to talc since glass filling hides scratches and scuffs better than talc. The glass also adds strength and stiffness to the material while reducing the material's coefficient of linear thermal expansion which is important when overmolding. While glass-filled nylon is generally preferred, it should be appreciated that the overmolded outer shell 40 may be made from other plastic such as ionomers and polypropylene.

After completing the overmolding process at step 212 (FIG. 5), the cleat body 12 is ready for final assembly including attachment of the latch assembly 16 to the cleat body 12 by means of the spine 64.

In summary, the new and improved tie down cleat assembly 10 provides a number of benefits and advantages. The new tie down cleat assembly 10 offers maximum utility and ease of use when compared to current aftermarket and OEM tie down cleat offerings. The new tie down cleat assembly 10 withstands loads as high as 2400 pounds in a crush situation meaning the new cleat can be certified to 600 pounds.

The tie down cleat assembly 10 has an aesthetically pleasing and rugged look. The reinforcing element 38 adds strength and weight giving the cleat body 12 a solid quality feel while the overmolded outer shell 40 of plastic material prevents oxidation and corrosion while hiding scratches.

The reinforcing element 38 adds sufficient strength so that the overall cross section of the cleat body 12 may be reduced to work with most aftermarket tie down straps. The first or central receiver 20 has a bigger opening to allow a customer to tie down a load with thick ropes while the smaller second and third receivers 22, 24 flanking the first receiver 20 are advantageously sized to receive and hold hooks on standard bungee cords. This increases the versatility of the tie down cleats which maintain their stiffness and strength with little variation in extreme temperatures from, for example, minus 40 degrees Celsius to 93.3 degrees Celsius. Significantly, the tie down cleat assembly 10 offers maximum load capability and utility at a significantly lower cost than a die cast tie down cleat.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A tie down cleat assembly, comprising a cleat body including: (i) a reinforcing element made of steel, said reinforcing element having a zinc coating and a cathodic electrocoat over said zinc coating; (ii) an overmolded outer shell made of plastic; (iii) a mounting lug; (iv) a first receiver having a first inner margin of said cleat body defining a first aperture, wherein said first inner margin is formed by a portion of said overmolded outer shell; (v) a second receiver having a second inner margin of said cleat body defining a second aperture, wherein said second inner margin is formed by a first exposed portion of said reinforcing element; and (vi) a third receiver having a third inner margin of said cleat body defining a third aperture, wherein said third inner margin is formed by a second exposed portion of said reinforcing element, and wherein said second inner margin and said third inner margin flank said first inner margin.

2. The tie down cleat assembly of claim 1, wherein said reinforcing element includes a powder coat over said cathodic electrocoat.

3. The tie down cleat assembly of claim 2, wherein said cathodic electrocoat is a cathodic epoxy electrocoat.

4. The tie down cleat assembly of claim 2, wherein said cathodic electrocoat is a cathodic acrylic electrocoat.

5. The tie down cleat assembly of claim 4, further including a latch assembly comprising a lock body pivotally secured to said cleat body by a spine.

6. The tie down cleat assembly of claim 5, further including a lock cylinder and a latch bolt carried on said lock body.

7. The tie down cleat assembly of claim 6, further including an anchor plate fixed to a body of a motor vehicle, said anchor plate including a keyhole receiver.

8. The tie down cleat assembly of claim 7, wherein said keyhole receiver includes a first section receiving and engaging said mounting lug and a second section receiving and engaging said lock body.

9. The tie down cleat assembly of claim 8, wherein said lock body includes at least one lug engaging with a sidewall of said second section of said keyhole receiver.

10. The tie down cleat assembly of claim 9, further including a tool to displace said latch bolt between a locked position engaged with said anchor plate and an unlocked position disengaged from said anchor plate.

11. The tie down assembly of claim 1, wherein said first receiver, said second receiver and said third receiver are open to receive a tether.

* * * * *